United States Patent
Braun et al.

(10) Patent No.: US 8,308,577 B2
(45) Date of Patent: Nov. 13, 2012

(54) BEARING ARRANGEMENT FOR A UNIVERSAL JOINT

(75) Inventors: Achim Braun, Vaihingen/Enz (DE); Thomas Schmidt, Hauneck (DE)

(73) Assignee: ELBE Holding GmbH & Co. KG, Bietigheim-Bissingen (DE)

( * ) Notice: Subject to any disclaimer, the term of this patent is extended or adjusted under 35 U.S.C. 154(b) by 343 days.

(21) Appl. No.: 12/448,995

(22) PCT Filed: Jan. 18, 2008

(86) PCT No.: PCT/EP2008/050549
§ 371 (c)(1),
(2), (4) Date: Jan. 4, 2010

(87) PCT Pub. No.: WO2008/087203
PCT Pub. Date: Jul. 24, 2008

(65) Prior Publication Data
US 2011/0033148 A1   Feb. 10, 2011

(30) Foreign Application Priority Data
Jan. 19, 2007   (DE) .................. 10 2007 003 789

(51) Int. Cl.
*F16D 3/26* (2006.01)
(52) U.S. Cl. ..................... 464/132; 464/905
(58) Field of Classification Search .............. 464/128, 464/130, 132, 136, 905; 384/127, 584, 585, 384/903
See application file for complete search history.

(56) References Cited

U.S. PATENT DOCUMENTS

| | | | | |
|---|---|---|---|---|
| 1,993,357 A | * | 3/1935 | Braun et al. ............. | 464/130 |
| 2,512,690 A | * | 6/1950 | Smith et al. ............. | 464/130 |
| 5,417,613 A | * | 5/1995 | Aiken ..................... | 464/130 |
| 5,547,423 A | * | 8/1996 | Lindenthal et al. ...... | 464/136 |
| 6,855,060 B2 | * | 2/2005 | Breese et al. ........... | 464/130 |
| 7,140,968 B2 | * | 11/2006 | Gille et al. .............. | 464/130 |
| 7,887,422 B2 | * | 2/2011 | Stambek et al. ......... | 464/130 |
| 2004/0247386 A1 | | 12/2004 | Sugiyama et al. | |
| 2005/0037850 A1 | | 2/2005 | Bommarito et al. | |
| 2005/0079916 A1 | * | 4/2005 | Bongartz et al. | |
| 2006/0073901 A1 | | 4/2006 | Bommarito | |
| 2006/0189395 A1 | * | 8/2006 | Wehner .................. | 464/130 |
| 2006/0252557 A1 | * | 11/2006 | Schultze et al. ......... | 464/130 |

FOREIGN PATENT DOCUMENTS

| | | | | |
|---|---|---|---|---|
| DE | 19840336 | | 3/2000 | |
| JP | 59166717 | * | 9/1984 | .............. 464/130 |

* cited by examiner

*Primary Examiner* — Gregory Binda
*Assistant Examiner* — Josh Skroupa
(74) *Attorney, Agent, or Firm* — Hudak, Shunk & Farine Co. LPA

(57) ABSTRACT

A secured bearing arrangement for at least one journal of a universal joint, said journal being rotatable about an axis of rotation while being mounted in a housing. The bearing arrangement comprises at least one universal joint housing that is provided with at least one bore which extends in the direction of an axis and has an internal surface as a bearing surface. A bearing bush which has a bearing axis and inside which the journal is mounted so as to be rotatable about its axis or rotation, is mounted on the internal surface within the bore. A securing element allows the bearing bush to be secured within the bore in one axial direction of the bearing axis, said one axial direction facing away from the journal. The securing element is disposed between the mounted bearing bush and the universal joint housing in a radial direction of the bearing axis while being connected to the universal joint housing between the mounted bearing bush and the universal joint housing.

8 Claims, 2 Drawing Sheets

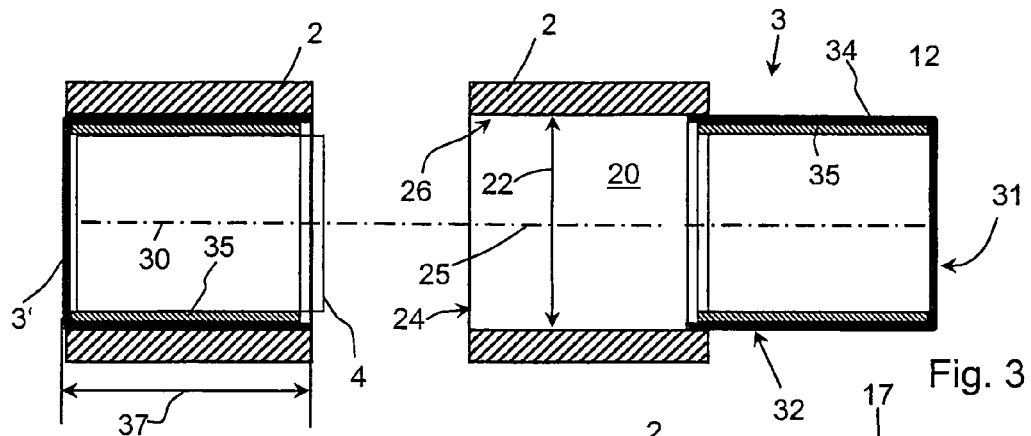
Fig. 3
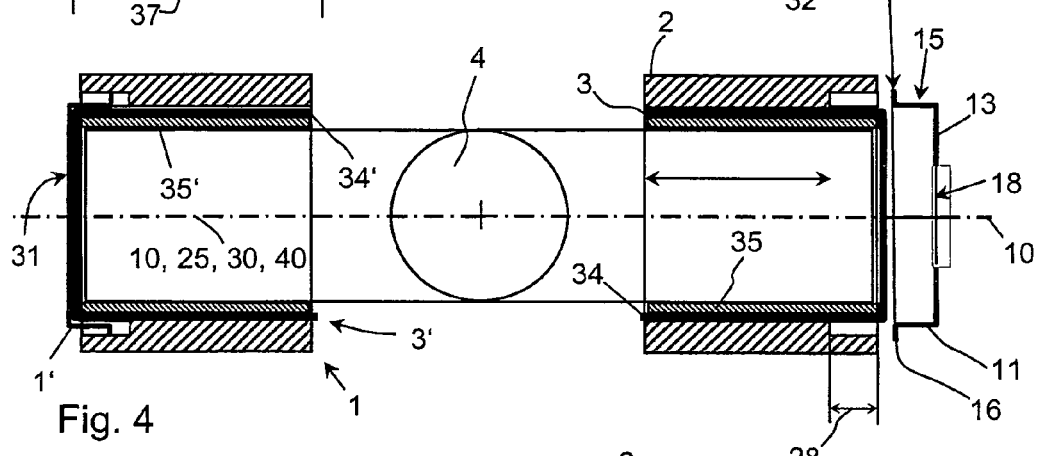
Fig. 4
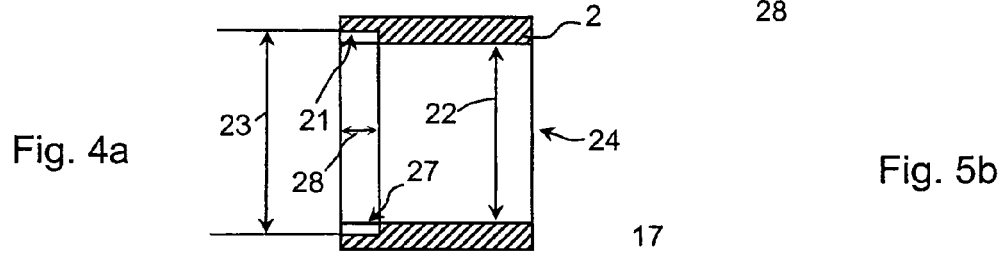
Fig. 4a
Fig. 5b
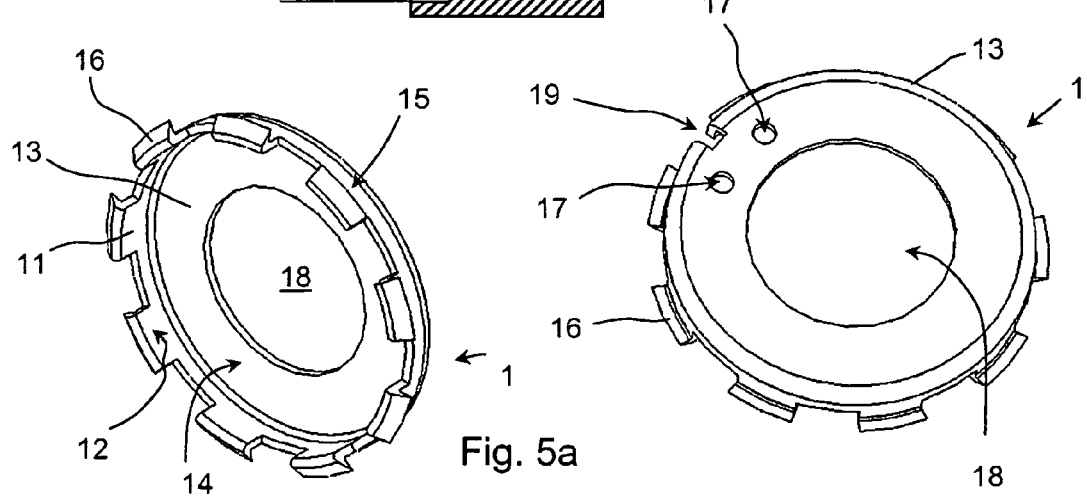
Fig. 5a

BEARING ARRANGEMENT FOR A UNIVERSAL JOINT

FIELD OF INVENTION

The invention pertains to a secured bearing arrangement for at least one journal of a universal joint, able to turn about an axis of rotation, and mounted in a housing. This bearing arrangement has at least one universal joint housing of a universal joint with at least one bore running in the direction of an axle with an internal surface as the bearing surface. In the bore is mounted a bearing bush with a bearing axis on the inner surface, in which the journal can be mounted to turn about its axis of rotation. Thanks to a securing element, the bearing bush is secured inside the bore in the axial direction of the bearing axis away from the journal. The securing element is arranged in the radial direction of the bearing axis between the mounted bearing bush and the universal joint housing and at the same time it is connected to the universal joint housing between the mounted bearing bush and the universal joint housing.

BACKGROUND OF THE INVENTION

In many universal joints of this kind the bearing bush, which sits on the journal, is secured by a securing ring in the axial direction. The securing ring is inserted into an encircling groove in the housing in front of the bearing bush. For this, the housing projects past the bearing bush by several millimeters to the front. This fundamental technique is known, for example, from US 2005/0037850 A1. A securing element fashioned as a securing ring is inserted into a groove in the housing in front of the bearing bush in the direction of the bearing axis. Thanks to the steplike configuration of the securing ring with different diameters, it is possible to adjust the play in the direction of the bearing axis between the bearing bush and the journal.

As compared to the above described method of bearing securement, to increase the transmissible torque one uses a longer bearing bush, corresponding to the length of the bore. The securing ring in this case is no longer inserted into a groove in the bearing surface of the housing or in a groove in the bearing bush in front of the bearing bush, but between the bearing bush and the housing. In EP 1 719 928 A2, such an axial securing arrangement is described, in which the securing ring is arranged in the direction of the axis of rotation of the journal, i.e., in the axial direction, not in front of the bearing bush, but in the region of the outer side surface of the bearing bush, encircling the bearing bush. In this case, the bearing bush does not strike against the securing element with its end face in the axial direction, as described in US 2005/0037850 A1, but instead the securing element cuts into the bearing surfaces of the housing or the bearing bush, so that the surfaces of these bearing surfaces become damaged.

One benefit of the bearing described in EP 1 719 928 A2 as compared to the technique mentioned above is that, thanks to shifting the securing ring from in front of the bearing bush to a region between the bearing bush and the housing, one can increase the length of the bearing bush, since the bearing bush can extend for the entire length of the housing. This leads to an increase in the transmissible torque and to an increase in the service life. EP 1 719 928 A2 is considered to be the closest prior art.

Starting from EP 1 719 928 A2, the basic problem of the invention is to configure the bearing of the journal of a universal joint so that the bearing surfaces in the universal joint housing and on the bearing bush are not damaged either during installation or dismounting of the bearing arrangement and in case of a repeated installation the dimensional tolerances created during production remain intact in all regions of the bearing surfaces, while at the same time the entire housing length is available for the bearing bush.

SUMMARY OF THE INVENTION

The problem is solved according to the invention by two solutions. A first solution is that the universal joint housing can have an indentation on the bore, forming a surface coaxial and parallel to the bore, and the securing cover can be connected positively to the universal joint housing via the surface.

In this way, the securing cover does not cut into the inner surface of the bore, provided as the bearing surface, either during the installation or the dismounting of the securing cover. In the region where the indentation is provided, the bearing bush itself does not lie against the universal joint housing. The securing cover is fixed above the universal joint housing, which is advantageous in that the bearing surface of the bearing bush is also not damaged by the securing cover. The movement of the bearing bush on the journal is limited by the securing cover only in the direction of the axis of rotation facing away from the journal. Thus, the securing cover does not engage with a bearing surface, either the inner surface of the bore or the bearing surface of the bearing bush.

The second solution envisions that the securing element can be configured in the form of an adhesive layer between the bearing bush and the universal joint housing.

This solution also ensures that neither the inner surface of the bore nor the bearing surface of the bearing bush will be damaged by the securing element. For the mounting of the bearing bush, adhesive is applied to the bearing surface of the bearing bush or to the inner surface of the bore and the bearing bush is pressed into the bore, forming an adhesive layer between the bearing bush and the universal joint housing, and the excess adhesive is scraped off by the edge of the bore. The adhesive hardens under influence of the radial pressure between the bearing bush and the universal joint housing. The bearing surfaces remain intact. If the bearing bush is then dismounted, the adhesive layer is loosened, and again the bearing surfaces will not be damaged.

Both solutions have the further benefit that after the bearing bush has been installed one can recognize whether the securing element is installed, which is not possible in the closest prior art, since the securing element is not visible in the installed state. Neither can one check to see if the securing element is installed by taking out or moving the bearing bush, since the bearing bush sits firmly in the universal joint housing, thanks to the press fitting. According to the solutions of the invention, the securing cover as well as the traces of excess glue that are scraped off when the bearing bush is pressed in are recognizable after the installation.

It is advantage here that the diameter of the indentation can be between 1.5 mm and 8 mm larger than the diameter of the bore. Depending on how large the securing cover is and how the securing cover is fixed in the universal joint housing, indentations with different diameters are necessary. It is especially advantageous that the securing cover can be configured with a U-shaped profile surrounding the end face of the bearing bush and be arranged partly between the bearing bush and the universal joint housing, with the securing cover at least partly enclosing the bearing bush in the circumferential direction toward the axle. Thanks to the U-shaped configuration of the securing cover in relation to the cross sectional plane of the bearing axis, the securing cover reaches into the bore from the end face of the bearing bush and encircles the bearing bush, so that it adjoins the universal joint housing in a region between the bearing bush and the universal joint housing. Thus, even after the installation, the securing cover is not hidden by the bearing bush or another component and can be dismounted again at any time, without dismounting the bearing bush. This is very advantageous in connection with the problem of not damaging the bearing surfaces, since the bearing arrangement can thus be maintained without major expense.

Depending on the size of the profile of the securing cover, it is advantageous for the indentation to have a depth, measured from the opening of the bore, between 3 mm and 35 mm, so that the securing cover can be adjusted with corresponding bearing play in the direction of the bearing axis in relation to the journal. The depth of the indentation corresponds to the width of the surface formed by the indentation.

In regard to the shape of the U-profile, it is advantageous for the securing cover to have a center axis which can be positioned coaxial to the axis of the bore, and the securing cover can have a cylindrical shell piece arranged coaxially to the center axis and extending in the direction of the center axis, and the securing cover can be fixed via the shell piece in the bore in an axial direction of the center axis in the universal joint housing. The shell piece extends by its length from the inside of the universal joint housing, where the securing cover is fixed on the universal joint housing, to the region in front of the end face of the bearing bush, so that the shell piece embraces in the circumferential direction the outermost part of the bearing bush in the direction of the bearing axis. The size of the U-profile depends on the length of the shell piece.

In regard to the U-profile it is furthermore advantageous that the securing cover can have a disk-shaped bearing part with a bearing surface, adjacent to the shell piece and extending in relation to the center axis in the radial direction inward toward the center axis, and the bearing surface of the securing cover can be placed at least partly against the end face of the bearing bush. The bearing part ensures that the bearing bush is secured in the axial direction of the bearing axis facing away from the journal by a stop at the end face, without engaging with the bearing surface, and at the same time the securing cover can be dismounted from the front, i.e., from the end face side through the bearing part.

It is also advantageous for the shell piece to have a cylindrical mounting surface arranged concentric to the center axis and for the mounting surface to abut directly or indirectly against a surface provided in the universal joint housing. Via the mounting surface, which runs parallel to the surface of the indentation, the securing cover can be oriented and fixed positively and/or nonpositively in the housing.

In one special embodiment, the securing cover can be fixed via the mounting surface by means of adhesive on the surface in axial and radial direction of the center axis. In this case, the mounting surface of the securing cover and the surface of the bore have a certain bearing fit, so that the securing cover can be positioned at first by virtue of friction between the mounting surface and the surface and be fixed in a second step after the hardening of the adhesive.

In another embodiment, the securing cover has at least one fastening means arranged on the shell piece and the securing cover can be fixed by the fastening means positively and/or frictionally in axial and in radial directions of the center axis on the surface. The fastening means is oriented radially outward in relation to the bearing axis and penetrates into the top of the indentation surface.

For this, it is advantageous for the fastening means to be configured as a claw or thread oriented at least partly outward in the radial direction in regard to the center axis and the securing cover can be fixed positively or nonpositively in the universal joint housing via the fastening means and the surface. Advantageous is a claw which cuts into the surface of the indentation by self locking as the securing cover moves in the axial direction of the bearing axis facing away from the journal, and slides across the surface of the indentation during a movement in the opposite direction toward the journal.

Another preferred embodiment consists in the surface of the indentation having an inner thread for the fastening means in the form of a thread. The outer thread is cut into the mounting surface, so that the securing cover, as with a worm screw, can be turned in the universal joint housing. For the securing of the securing cover, adhesive will be placed in the thread configured as the fastening means, so that after installation the securing cover is not skewed relative to the universal joint housing. Alternatively, self-locking hooks can be formed on the thread, which only allow a turning and screwing movement of the securing cover in one direction of turning of the securing cover. A further alternative is to mold a part on the securing cover which, after installation of the securing cover, is bent against the housing or against the bearing bush, and in the circumferential direction this part is stopped against the universal joint housing, so that the securing cover cannot go awry.

In regard to the installing and dismounting of the securing cover, it is advantageous that the securing cover is not closed [in the] circumferential direction toward the center axis and the securing cover can be pressed together in the circumferential direction. The securing cover is fashioned as a partial circular disk or it has at least one parting plane situated in the radial direction to the center axis, so that the securing cover does not form a closed disklike element and it can be pressed together in the circumferential direction. As a result, the adjustment of the securing cover in the case of using claws is easier both in the non-self-locking direction and the self-locking direction, because the pressure of the claws on the indentation is reduced if the securing cover is made smaller in diameter. For the dismounting, the securing cover is reduced in diameter enough so that the claws become free and the securing cover can be taken out from the bore. For this, it is advantageous that the parting plane can be configured as a predetermined breaking site and be at least partially closed. Since the parting plane is closed, the internal stress of the securing cover in the circumferential direction is substantially greater, because the securing cover is less elastic in the circumferential direction. When the joint is closed, the internal stress is provided mainly by the shell piece.

A simple installing and dismounting and at the same time greater stability is achieved in that the parting plane can be filled at least partly with solder. For the installing, the parting plane is open, so that the diameter of the securing cover can be easily reduced, the claws released in succession, and the securing cover pulled out. After the installation, the parting plane is closed with solder, so that the securing cover becomes more stable and rigid. For the dismounting, the parting plane is opened once more by heating the solder, thus opening the parting plane.

For this it is advantageous to provide seats in the bearing part, by which the securing cover can be pressed together with a tool and reduced in its diameter. In the most simple case, the seats are fashioned as holes, with which a circlip or pointed pliers can engage to press the securing cover together.

Moreover, it is advantageous to fashion the securing cover as a single piece of identical material, consisting of the shell piece and the bearing part. The securing cover is first punched out, then deep drawn or bent, and finally ground or lathe-turned if necessary, depending on the type of fastening means.

As a variant to this, it is beneficial to form the securing cover as a single piece using at least two different kinds of material, consisting of the shell piece and the bearing part. For example, one will consider here the combination of metal with plastic or ceramic.

Preferable is a bearing system with two universal joint housings, each configured as a universal joint yoke, which are rotatably connected by a one-piece spider to four journals and four bearing bushes configured as universal joint bushes. Each universal joint housing has two aligned bores, so that each one of four bearing bushes with one journal sits in one bore in one part of the universal joint yoke.

In general and in the meaning of the invention, a bore is rotationally symmetrical to the bore axis, so that a bearing bush arranged in the bore and also a journal or a shaft are centered relative to each other and arranged with the bearing axis or the axis of rotation or axle coaxial to the bore. The bearing bush described in the context of the invention need not necessarily be completely rotationally symmetrical, but it has a bearing axis about which the journal turns. The bearing bush differs from a bearing shell in being closed at one side.

BRIEF DESCRIPTION OF THE DRAWINGS

Further benefits and details of the invention are explained in the patent claims and the specification, as well as presented in the figures. There is shown:

FIG. 3, a sectional view of a bearing arrangement consisting of a housing and two bearing bushes facing each other;

FIG. 4a, a sectional view of a universal joint housing with an indentation;

FIG. 4, a sectional view of a bearing arrangement consisting of a housing, two bearing bushes arranged opposite each other, and one securing cover for each bearing bush;

FIG. 5a, a perspective view of a securing cover with claws, from below;

FIG. 5b, a perspective view of a securing cover with claws and seats, from above.

DETAILED DESCRIPTION OF THE INVENTION

Figure 1:
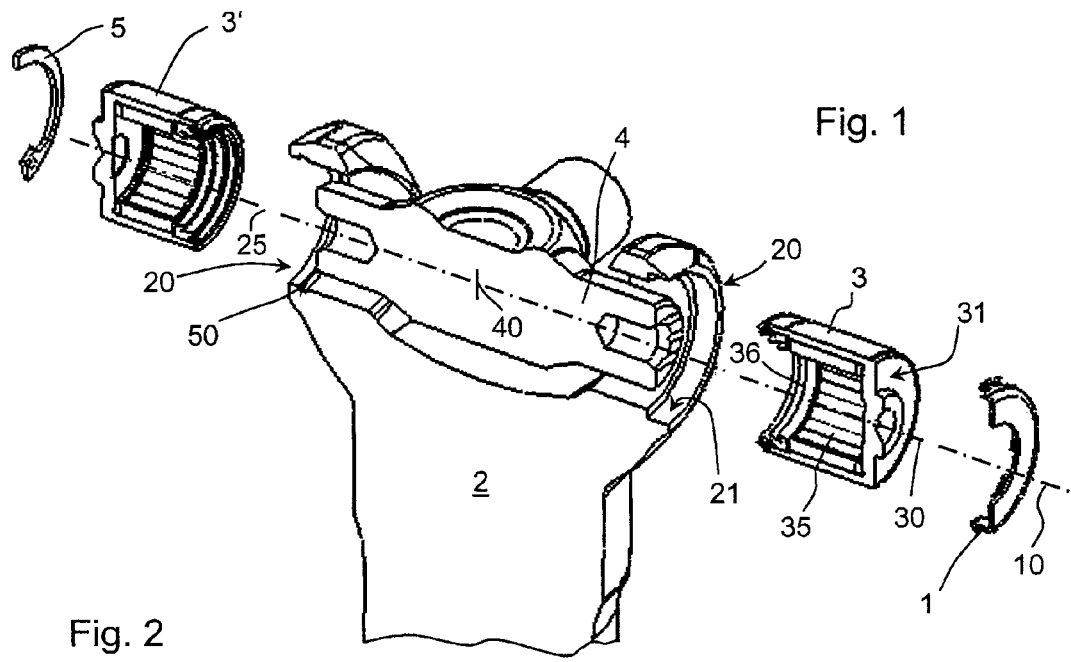
FIG. 1, a perspective sectional view of a universal joint with a securing cover (right) and a securing ring according to the prior art (left)
Figure 2:
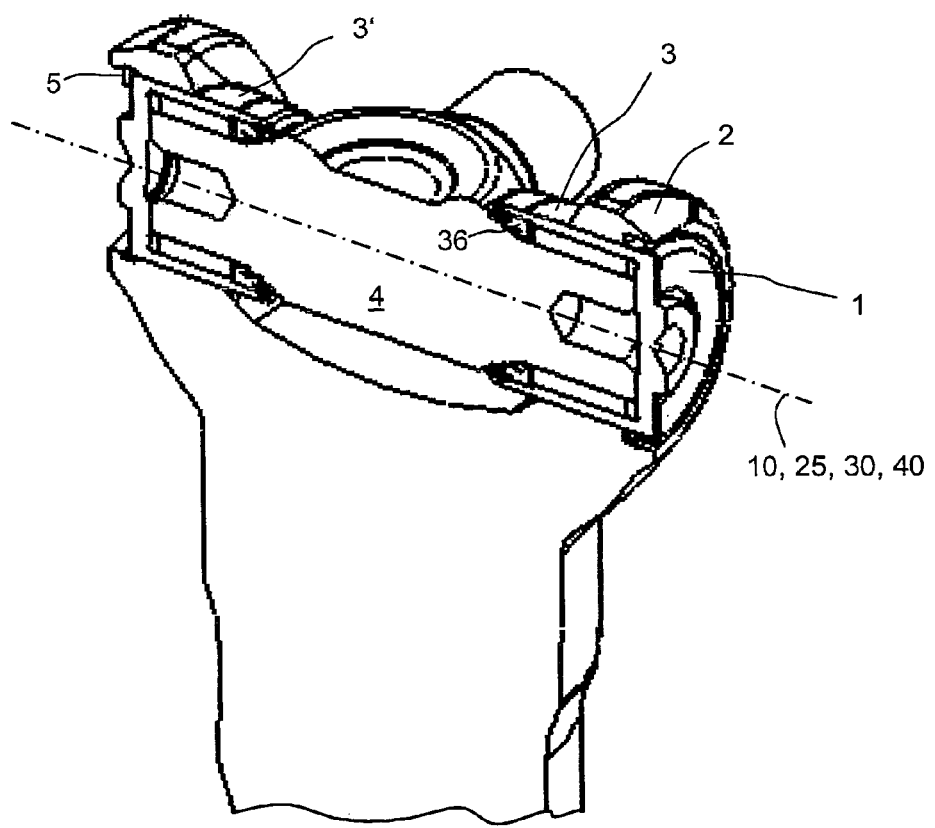
FIG. 2, a perspective sectional view of a universal joint per FIG. 1 in the installed state.

The bearing arrangement shown in FIGS. 1 and 2 is integrated in a universal joint, showing one half of a spider with its journal 4 and the lower of two universal joint housings 2 in part. Each individual journal 4 of the spider is mounted separately via a bearing bush 3 in the universal joint housing 2. For this, the journal 4 is introduced into universal joint housing 2 in the particular bore 20 of the universal joint housing 2 and the bearing bush 3 is pressed into the bore 20 of the universal joint housing 2 from the outside and shoved onto the journal 4. FIGS. 1 and 2 each show a perspective sectional view of the universal joint housing 2 with the two bearing bushes 3, 3' arranged facing each other. The right-hand bearing bush 3 is secured by a securing cover according to the invention. The securing cover 1 is pulled on over the bearing bush 3 and secured between the bearing bush 3 and the bore 20 on the universal joint housing 2.

The bearing bush 3' shown on the left-hand side in FIGS. 1 and 2 is secured by an embodiment of the bearing arrangement known in the prior art. A securing ring 5 is inserted in the radial direction toward the axis of rotation 40 into a groove 50 in the universal joint housing 2 and the bearing bush 3' is fixed outwardly in the axial direction to the axis of rotation 40.

The bearing bush 3 has, as also shown in detail in FIGS. 3 and 4, a closed, cylindrical bush 34, configured as a housing, with an outer end face 31 and a cylindrical outer bearing surface 32. By the bearing surface 32, the bearing bush 3 is mounted in the universal joint housing 2 on the inner surface 26 of the bore 20 in the radial direction to the bearing axis 30. Inside the bush 34 there is arranged a rolling bearing 35, having several cylindrical roller bodies, arranged so as to rotate parallel to the bearing axis 30 on the inside of the bush 34. A lubricant is introduced between the bearing bush 3 and the journal 4, so that the bearing bush 3 is sealed against the journal 4 by a seal 36 and the lubricant cannot escape from the bearing bush 3.

FIG. 3 shows a simplified representation of a bearing arrangement, in which the securing of the bearing bushes 3, 3' is provided by an adhesive layer, not shown, as the securing element in the bore 20 of the universal joint housing 2. The left bearing bush 3' is placed on the only partly shown journal 4 and mounted by its entire length 37 in the bore 20 of the universal joint housing 2. At the right side of FIG. 3, the journal 4 is not shown for sake of clarity. The bearing bush 3 and the bore 20 in the universal joint housing 2 have a press fit, so that the diameter of the bearing bush 3 is slightly larger than the diameter 22 of the bore 20 in the universal joint housing 2. The bearing bush 3 consists of a bush 34 and a rolling bearing 35. The bush 34 forms the bearing surface 32 of the bearing bush 3, by which the bearing bush 3 is mounted on the inner surface 26 of the bore 20. The bearing bush 3 here is arranged with its bearing axis 30 coaxial to the axis 25 of the bore 20.

FIG. 4 shows a simplified representation of a bearing arrangement, in which a securing cover 1 is provided for the fixation of the bearing bush 3. The journal 4, as suggested in FIG. 4 and shown in FIG. 1 and FIG. 2, is configured as a universal joint journal and mounted indirectly by one bearing bush 3, 3' each in the two bores 20 of the universal joint housing 2. The two bearing bushes 3, 3' are each secured on the outside by a securing cover 1, 1' in the axial directions of the axis of rotation 40 shown by an arrow.

To fasten the securing cover 1, the bore 20 has, as shown in FIG. 4a, an indentation 27 with a surface 21 arranged parallel and coaxial to the inner surface 26 of the bore 20. The diameter 23 of the indentation 27 is larger than the diameter 22 of the bore 20, so that the securing cover 1 can be fastened between the bearing bush 3 and the universal joint housing 2. The securing cover 1 serves as a stop for the bearing bush 3 and is positioned in the axial direction so that a certain play is present in the axial direction of the axis of rotation 40 between the bearing bush 3 and the respective journal 4. As explained below, the securing cover 1 can be adjusted continuously, so that the necessary play can be set easily and precisely. The depth 28 of the indentation 27 varies in dependence on the size of the securing cover 1.

After the journal 4 is introduced into the bore 20 of the housing 2, the bearing bush 3 is pressed into the bore 20 via the journal 4 and the play is adjusted in the axial direction of the axis of rotation 20 or bearing axis 30. For this, the securing cover 1 has a shell piece 11 that can be positioned coaxially to the bearing bush 3 and a bearing part 13 adjoining the shell piece 11 in the radial direction on the inside. The shell piece 11 has an outwardly pointing mounting surface 15, arranged coaxially and parallel to the surface 21 of the indentation 27, by which the securing cover 1 is fastened on the universal joint housing 2. Moreover, the bearing part 13 has an inwardly pointing bearing surface 14, which serves as a stop for the end face of the journal 4, running parallel to the bearing part 13.

Adjoining the shell piece 11, as illustrated in FIG. 5a, on the exterior mounting surface 15 are several fastening means 16 fashioned as claws, arranged in the circumferential direction about the shell surface 12 and spaced apart in the circumferential direction. In this sample embodiment, a securing cover 1 is shown on which nine claws 16 are arranged, spaced apart from each other in the circumferential direction. The claws 16 pointing outward in the radial direction to the center axis 10 slide on a surface 21 provided coaxial to the bore 20 into the inside of the housing when the securing cover 1 is introduced into the bore 20. Thanks to the shape of the claws 16, a self-locking effect is produced, so that the securing cover 1 can only be pushed into the bore 20 in the universal joint housing 2 in the axial direction of the bearing axis, but no longer pulled or forced out from the bore 20. Thus, the claws 16 provide a self-locking in the axial direction of the bearing axis 30 facing away from the journal 4. A blade formed in the radial direction at the end of each claw 16 penetrates more or less depending on the choice of material and the tension, but at least in the visible region into the surface 21 as soon as pressure is exerted on the securing cover 1 in the direction out from the universal joint housing 2. The depressions formed in this way in the surface 21 act as positive locking of the securing cover 1 and thus, through the bearing bush 3, as axial securing of the journal 4.

The holding force exerted by the claws 16 is transmitted via the shell piece 11 onto a bearing part 13 arranged at right angles to the shell piece 11 and adjoining the shell piece 11. The bearing part 13 is arranged parallel to the end face 31 of the bearing bush 3, so that the journal 4 abuts against the bearing part 13 via the bearing bush 3. For this, the bearing part 13 has the inwardly pointing bearing surface 14, which abuts against the end face 31 of the bearing bush 3 depending on the bearing play.

The bearing part 13 is shaped as a circular disk and has a recess 18 at the center in this sample embodiment. Thanks to this recess 18, the play between the bearing part 13 and the journal 4 can be controlled. Moreover, it is possible to arrange a lubricating nipple at the end face 31 or bottom of the bearing bush 3, being accessible through the recess 18.

In the event that the journal 4 or the bearing bush 3 needs to be dismounted, the securing cover 1 can be removed. For this, the bearing part 13 of the securing cover 1 can be severed at one point in the radial direction to the center axis 10 or in another direction, so that the securing cover 1 or the bearing part 13 can be reduced in diameter simply due to the resulting parting plane 19. The dismounting of the securing cover 1 is made easier in that the securing cover 1 has a parting plane 19 that runs in the radial direction to the center axis 10 and partly severs the securing cover 1. The parting plane 19 only needs to be further severed to remove the securing cover 1. The parting plane 19 is created between two spaced-apart claws 16, so that the securing cover 1 can be severed more easily.

FIG. 5b shows the already partly prefabricated parting plane 19, which can be further cut open for the dismounting. After being cut open, the securing cover 1 can be pressed together in the circumferential direction with a corresponding tool (not shown), which is inserted in corresponding recesses 10 fashioned as holes. In this way, the claws 16 are loosened, so that the securing cover 1 can be removed.

In the sample embodiment of FIG. 5b, the parting plane 19 is a kind of predetermined breaking point, so that a parting plane 19 can be produced by mechanical influence. Alternatively, the predetermined breaking point is such that a parting plane 19 is produced by thermal influence. For this, the prefabricated parting plane 19 is filled with solder, for example, which can easily be caused to melt, so that the parting plane 19 opens.

LIST OF REFERENCE SYMBOLS 1 securing element, securing cover
1' securing cover
10 center axis
11 shell piece
12 shell surface
13 bearing part
14 bearing surface
15 mounting surface
16 fastening means, claw, outer thread
17 seat
18 recess
19 parting plane
2 housing
20 bore
21 surface
22 diameter
23 diameter
24 opening
25 axis
26 inner surface
27 indentation
28 depth
3 bearing bush
3' bearing bush
30 bearing axis
31 end face, bottom
32 bearing surface
33 end face
34 bush
34' bush
35 rolling bearing
35' rolling bearing
36 sealing ring
4 journal
40 axis of rotation
5 securing ring (prior art)
50 groove (prior art)

What is claimed is:

1. A secured bearing arrangement for at least one journal of a universal joint, able to turn about an axis of rotation, comprising:
   a) at least one universal joint housing with at least one bore running in the direction of an axis with an internal surface and
   b) a bearing bush arranged in the bore with a bearing axis for a journal, in which the journal can be mounted to turn at least about its axis of rotation, and
   c) a securing cover to secure the bearing bush inside the bore in the axial direction of the bearing axis facing away from the journal, wherein
   d) the securing cover is arranged in the radial direction of the bearing axis between the mounted bearing bush and the universal joint housing and connected to the universal joint housing between the mounted bearing bush and the universal joint housing, wherein
   e) the universal joint housing has an indentation on the bore, forming a surface coaxial and parallel to the bore, and the securing cover is connected positively to the universal joint housing via the surface, wherein the indentation has a depth, measured from an opening of the bore, between a 3 mm and 35 mm, wherein the securing cover has a center axis which can be positioned coaxial to the and the securing cover has a cylindrical shell piece arranged coaxially to the center axis and extending in the direction of the center axis, and the securing cover can be fixed via the shell piece in the bore in an axial direction of the center axis in the universal joint housing, and wherein the securing cover has at least one fastening means arranged on the shell piece and the securing cover can be fixed by the fastening means positively and/or frictionally in axial and in radial directions of the center axis on the, surface of the indentation.

2. The bearing arrangement according to claim 1, wherein a diameter of is between 1.5 mm and 8 mm larger than a diameter of the bore.

3. The bearing arrangement according to claim 1, wherein the securing cover is configured with a U-shaped profile surrounding an end face of the bearing bush and arranged partly between the bearing bush and the universal joint housing, with the securing cover, at least partly enclosing the bearing bush in the circumferential direction toward the axis.

4. The bearing arrangement according to claim 1, wherein the securing cover has a disk-shaped bearing part with a bearing surface, adjacent to the shell piece and extending in relation to the center axis in the radial direction inward toward the center axis, and the bearing surface of the securing cover can be placed at least partly against an end face of the bearing bush.

5. The bearing arrangement according to claim 4, wherein the shell piece has a cylindrical mounting surface arranged concentric to the center axis and the mounting surface abuts directly or indirectly against the surface provided in the universal joint housing.

6. The bearing arrangement according to claim 5, wherein the fastening means is configured as a claw or thread oriented at least partly outward in the radial directions in regard to the center axis and the securing cover can be fixed positively or nonpositively in the universal joint housing via the fastening means and the surface and/or the surface has an inner thread for the fastening means.

7. The bearing arrangement according to claim 6, wherein the securing cover has a parting plane and therefore is not closed in the circumferential direction toward the center axis and the securing cover can be pressed together in the circumferential direction.

8. The bearing arrangement according to claim 7, wherein the parting plane is configured as a predetermined breaking site and is at least partially closed.

* * * * *

UNITED STATES PATENT AND TRADEMARK OFFICE
CERTIFICATE OF CORRECTION

PATENT NO. : 8,308,577 B2  Page 1 of 1
APPLICATION NO. : 12/448995
DATED : November 13, 2012
INVENTOR(S) : Achim Braun and Thomas Schmidt It is certified that error appears in the above-identified patent and that said Letters Patent is hereby corrected as shown below:

In claim 1, column 9, line 2, please add "axis," after the word "the".

In claim 2, column 9, line 13, please add "the indentation" after the words "diameter of".

Signed and Sealed this
Twenty-ninth Day of January, 2013

David J. Kappos
*Director of the United States Patent and Trademark Office*